(12) United States Patent
Stockbridge

(10) Patent No.: US 11,131,260 B2
(45) Date of Patent: Sep. 28, 2021

(54) TRANSPORT REFRIGERATION SYSTEM AND METHOD OF REGENERATING A DIESEL PARTICULATE FILTER

(71) Applicant: Carrier Corporation, Jupiter, FL (US)

(72) Inventor: Michael Stockbridge, Canastota, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/638,550

(22) PCT Filed: Aug. 13, 2018

(86) PCT No.: PCT/US2018/046458
§ 371 (c)(1),
(2) Date: Feb. 12, 2020

(87) PCT Pub. No.: WO2019/036344
PCT Pub. Date: Feb. 21, 2019

(65) Prior Publication Data
US 2020/0165992 A1    May 28, 2020

Related U.S. Application Data

(60) Provisional application No. 62/545,192, filed on Aug. 14, 2017.

(51) Int. Cl.
*F02D 41/02* (2006.01)
*B01D 46/00* (2006.01)
(Continued)

(52) U.S. Cl.
CPC ....... *F02D 41/029* (2013.01); *B01D 46/0063* (2013.01); *B60H 1/3226* (2013.01);
(Continued)

(58) Field of Classification Search
CPC ............... B60H 1/3226; B60H 1/3232; B01D 46/0063; B01D 2279/30; F02D 9/08;
(Continued)

(56) References Cited

U.S. PATENT DOCUMENTS 6,666,020 B2    12/2003    Tonetti et al.
6,826,905 B2    12/2004    Gui et al.
(Continued)

FOREIGN PATENT DOCUMENTS

GB    2229937 A    * 10/1990    ............... F02B 37/18
WO    0153664 A1    7/2001
(Continued)

OTHER PUBLICATIONS

International Search Report and Written Opinion for application PCT/US2018/046458, dated Aug. 13, 2018, U301330PCT, 14 pages.

*Primary Examiner* — Audrey K Bradley
(74) *Attorney, Agent, or Firm* — Cantor Colburn LLP

(57) ABSTRACT

A method for performing a regeneration cycle for regenerating a diesel particulate filter of a transport refrigeration system. The method includes increasing an air intake throttling level of an engine intake air flow by reducing an air control valve area. The method also includes supplementing the temperature increase of the air intake throttling by energizing an engine preheater.

12 Claims, 5 Drawing Sheets

(51) Int. Cl.
　　*B60H 1/32* (2006.01)
　　*F01N 3/023* (2006.01)
　　*F02B 63/06* (2006.01)
　　*F02D 9/08* (2006.01)
　　*F02D 41/00* (2006.01)
　　*F02M 31/04* (2006.01)

(52) U.S. Cl.
　　CPC .............. *F01N 3/023* (2013.01); *F02B 63/06* (2013.01); *F02D 9/08* (2013.01); *F02D 41/0002* (2013.01); *F02D 41/0245* (2013.01); *F02M 31/042* (2013.01); *B01D 2279/30* (2013.01); *B60H 1/3232* (2013.01)

(58) Field of Classification Search
　　CPC .............. F02D 41/0002; F02D 41/0245; F02D 41/029; F02D 2041/0022; F01N 3/023; F01N 9/002; F01N 2240/02; F01N 2430/00; F01N 2590/08; F02M 31/042; F02M 31/13; F02B 63/06
　　See application file for complete search history.

(56) References Cited

U.S. PATENT DOCUMENTS

| | | |
|---|---|---|
| 6,829,890 B2 | 12/2004 | Gui et al. |
| 7,237,379 B2 | 7/2007 | Nakano et al. |
| 7,334,397 B2 | 2/2008 | Blomquist |
| 7,513,108 B2 | 4/2009 | Tomlins et al. |
| 7,587,893 B2 | 9/2009 | Winsor |
| 7,841,170 B2 | 11/2010 | Collins et al. |
| 8,042,326 B2 | 10/2011 | Farell et al. |
| 8,091,347 B2 | 1/2012 | Hara et al. |
| 8,156,730 B2 | 4/2012 | Guo et al. |
| 8,261,535 B2 | 9/2012 | Marlett et al. |
| 8,776,502 B2 | 7/2014 | Hiemstra et al. |
| 8,893,474 B2 | 11/2014 | Ikawa et al. |
| 2008/0307771 A1 | 12/2008 | Barton et al. |
| 2009/0217649 A1 | 9/2009 | Bremser et al. |
| 2011/0146233 A1 | 6/2011 | Carlill et al. |
| 2016/0185187 A1 | 6/2016 | Steele et al. |
| 2017/0342882 A1* | 11/2017 | Kim ........................ F01N 3/027 |

FOREIGN PATENT DOCUMENTS

| | | |
|---|---|---|
| WO | 2009078847 A1 | 6/2009 |
| WO | 2013134238 A1 | 9/2013 |

\* cited by examiner

TRANSPORT REFRIGERATION SYSTEM AND METHOD OF REGENERATING A DIESEL PARTICULATE FILTER

BACKGROUND

This disclosure relates generally to transport refrigeration systems having an on-board diesel engine. More particularly, this disclosure relates to regeneration of a diesel particulate filter during operation of the transport refrigeration system.

Fruits, vegetables and other perishable items, including meat, poultry and fish, fresh or frozen, are commonly transported in the cargo box of a truck, a trailer, or in an intermodal container. Accordingly, it is customary to provide a transport refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes a fuel-fired engine, typically a diesel fueled engine.

In many truck/trailer transport refrigeration systems, the compressor of the transport refrigeration unit is driven by the engine shaft either through a belt/chain drive or by mechanical shaft-to-shaft coupling. Additionally, other components of the transport refrigeration unit, such as condenser fans, evaporator fans and an alternator, may be driven by the engine shaft through a belt/chain drive. More recently, all electric transport refrigeration systems have been developed for truck/trailer applications, wherein the engine drives an on-board generator for generating sufficient electrical power to drive an electric motor operatively associated with the compressor of the transport refrigeration unit. With respect to intermodal containers, clip-on power units, commonly referred to as generator sets or gensets, are available for mounting to the intermodal container, typically when the container is being transported by road or rail, to provide electrical power for operating the compressor drive motor of the transport refrigeration unit associated with the container. The genset includes a diesel engine and a generator driven by the diesel engine.

Although diesel engines function well in powering transport refrigerant systems, diesel engines produce exhaust gases that contain noxious emissions including carbon monoxide, oxides of nitrogen, unburned hydrocarbons and particulate matter. Diesel exhaust treatment units have been developed to reduce the emissions of carbon monoxide, unburned hydrocarbons and particulate matter emitted to the atmosphere. One type of diesel exhaust treatment unit is an in-line exhaust treatment unit that is installed in the exhaust pipe downstream of the engine exhaust manifold and includes a diesel oxidation catalyst and a diesel particulate filter disposed in series.

Although diesel particulate filters are effective in reducing particulate emissions emitted from diesel engines into the atmosphere, diesel particulate filters must be periodically subjected to a regeneration process to burn off the collected particulate matter in order to maintain the particulate removal effectiveness. In some systems, regeneration is facilitated by throttling engine intake air and performing fuel injection into the exhaust. Air intake throttling is needed to elevate the exhaust temperature to make the subsequent fuel injection effective. However, excessive air throttling can cause excessive particulate emissions that might clog the diesel particulate filter and reduce the oxygen content needed for the fuel injection reaction.

BRIEF SUMMARY

Disclosed is a method for performing a regeneration cycle for regenerating a diesel particulate filter of a transport refrigeration system. The method includes increasing an air intake throttling level of an engine intake air flow by reducing an air control valve area. The method also includes supplementing the temperature increase of the air intake throttling by energizing an engine preheater.

In addition to one or more of the features described above, or as an alternative, further embodiments may include that the air intake throttling level does not exceed a predetermined maximum air intake throttling level.

In addition to one or more of the features described above, or as an alternative, further embodiments may include that the supplemental temperature increase with the engine preheater is initiated after the maximum air intake throttling level is reached.

In addition to one or more of the features described above, or as an alternative, further embodiments may include delaying regeneration for an equalization period after initiation of the engine preheater.

Also disclosed is a method for performing a regeneration cycle for regenerating a diesel particulate filter of a transport refrigeration system. The method includes determining if an engine exhaust temperature is above a threshold temperature required for regeneration. The method also includes heating an engine intake air flow with an engine preheater until the engine exhaust temperature is above the threshold temperature required for regeneration.

In addition to one or more of the features described above, or as an alternative, further embodiments may include delaying regeneration for an equalization period after initiation of the engine preheater.

In addition to one or more of the features described above, or as an alternative, further embodiments may include increasing an air intake throttling level of the engine intake air flow by reducing an air control valve area prior to heating of the engine intake air flow with the engine preheater.

In addition to one or more of the features described above, or as an alternative, further embodiments may include that the air intake throttling level does not exceed a predetermined maximum air intake throttling level.

In addition to one or more of the features described above, or as an alternative, further embodiments may include that the supplemental temperature increase with the engine preheater is initiated after the maximum air intake throttling level is reached.

Further disclosed is a transport refrigeration system including a diesel engine powering the refrigeration unit, the diesel engine having an engine air preheat circuit and an exhaust system for discharging engine exhaust gas from the diesel engine to the atmosphere. Also included is a diesel engine exhaust gas treatment unit disposed in the diesel engine exhaust system, the diesel engine exhaust gas treatment unit including a diesel particulate filter. Further included is a refrigeration unit controller for controlling operation of the refrigeration unit, the refrigeration unit controller configured to perform a regeneration cycle for regenerating the diesel particulate filter by increasing an exhaust temperature of an exhaust gas flow, the exhaust temperature increased with an engine preheater which is part of the engine air preheat circuit.

In addition to one or more of the features described above, or as an alternative, further embodiments may include that the engine preheater increases the exhaust temperature subsequent to exhaust temperature heating performed by throttling an engine intake air flow with an air control valve.

In addition to one or more of the features described above, or as an alternative, further embodiments may include that the air control valve is adjustable to an area corresponding to a maximum air throttling level, the engine preheater being initiated subsequent to the air control valve reaching the maximum air throttling level.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
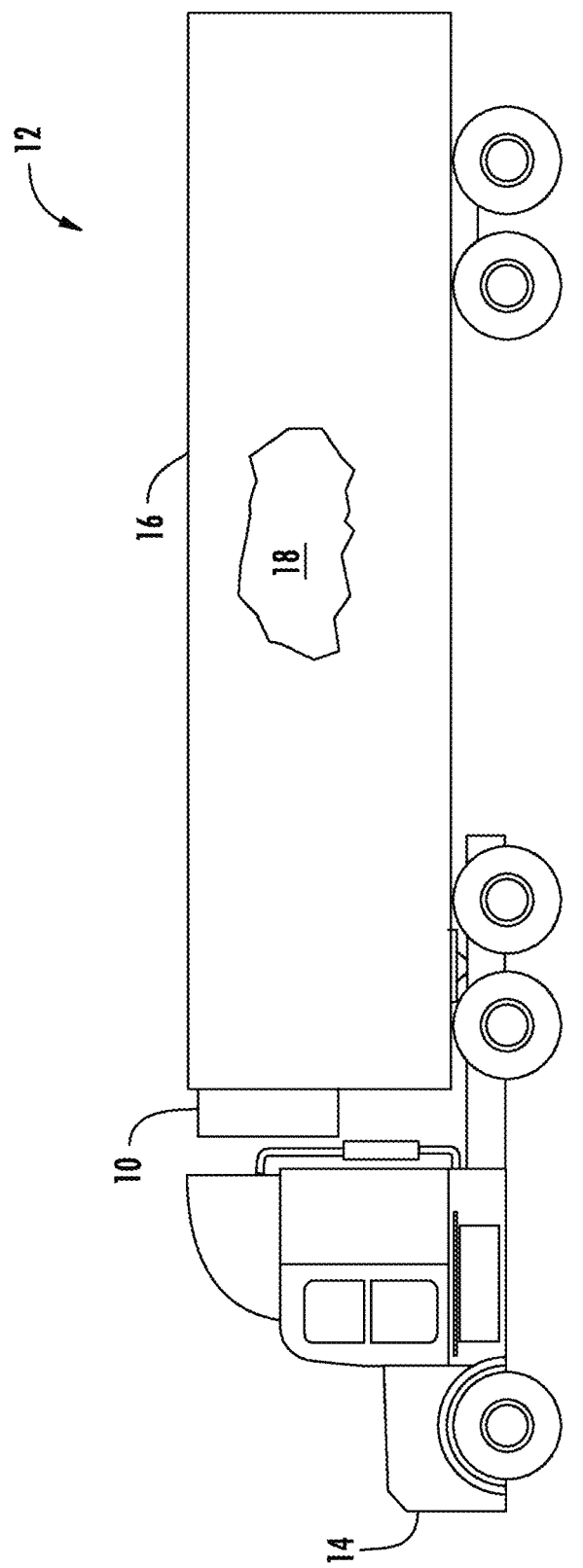
FIG. 1 is a refrigerated trailer equipped with a transport refrigeration system.

The system and method for regenerating a diesel particulate filter disclosed herein will be described in application on a transport refrigeration system 10 associated with a trailer 12 pulled by a tractor 14 as depicted in FIG. 1. The exemplary trailer 12 includes a cargo container/box 16 defining an interior space 18, wherein perishable product is stowed for transport. The transport refrigeration system 10 is operative to climate control the atmosphere within the interior space 18 of the cargo container/box 16 of the trailer 12. It is to be understood that the system and method disclosed herein may be applied not only to refrigeration systems associated with trailers, but also to refrigeration systems applied to refrigerated trucks, to intermodal containers equipped with gensets, and to other refrigeration systems including a refrigerant unit having an engine driven compressor.

Figure 2:
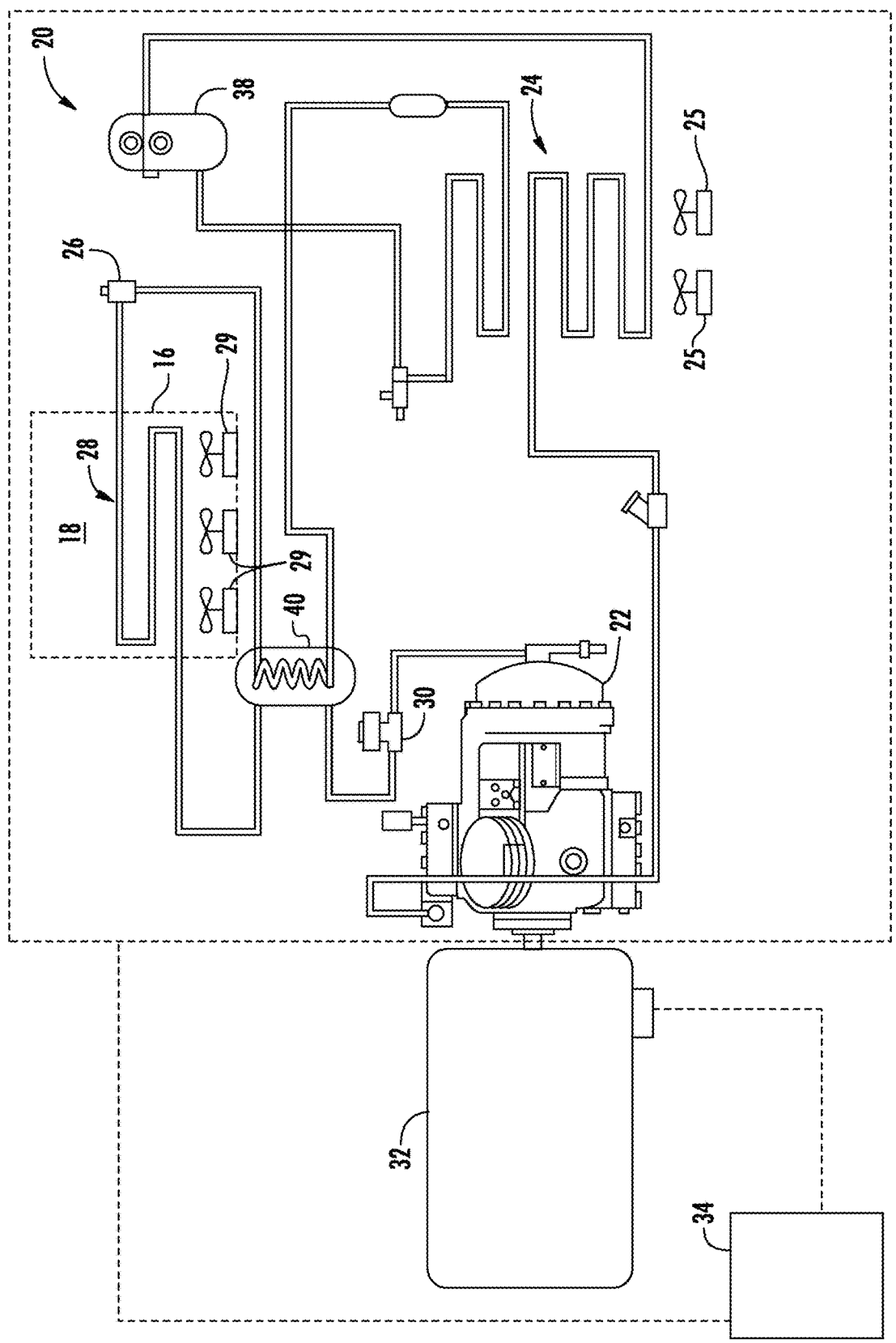
FIG. 2 is a schematic diagram of an embodiment of the transport refrigeration system.
Figure 3:
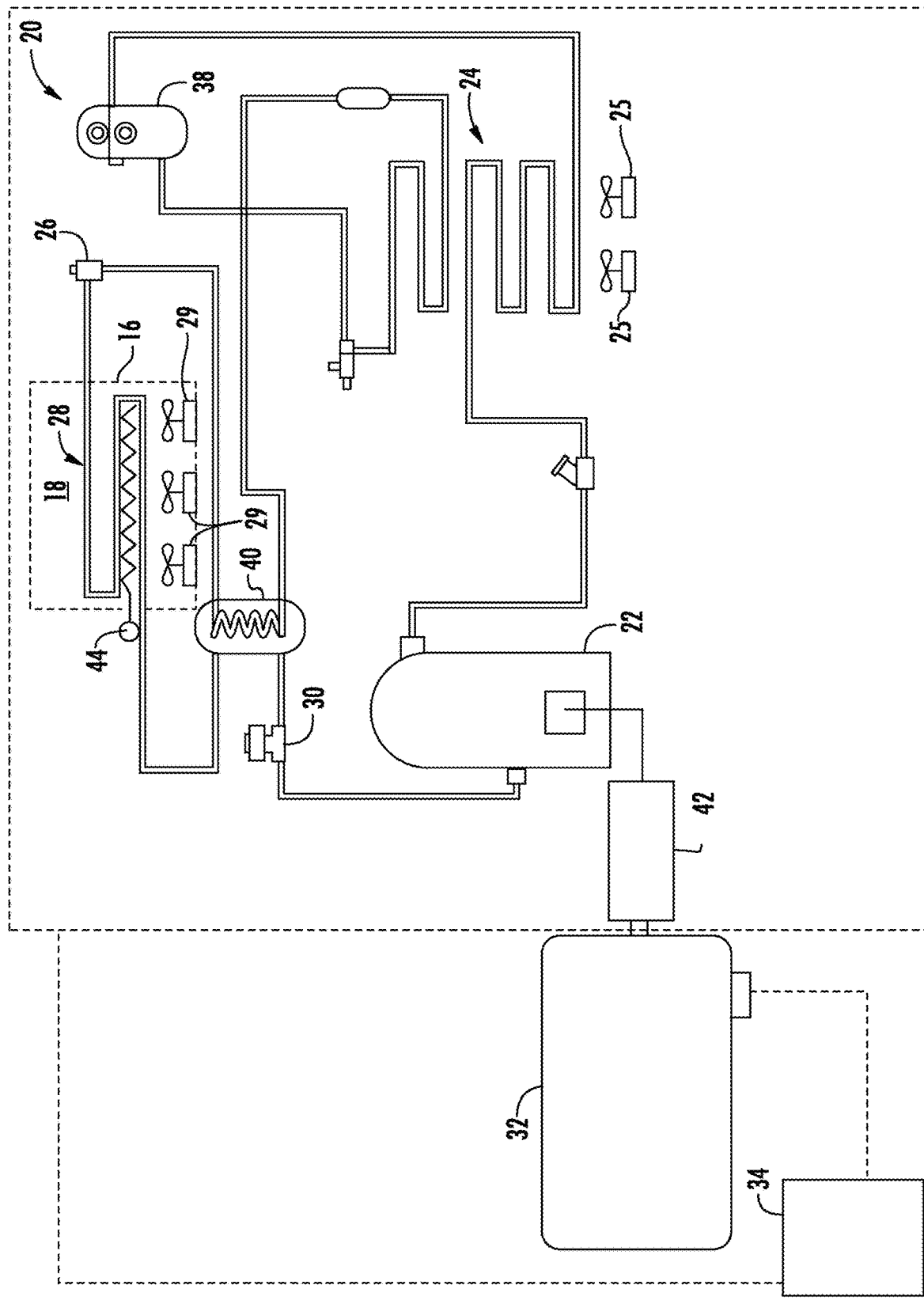
FIG. 3 is a schematic diagram of an embodiment of the transport refrigeration system.

Referring to FIGS. 2 and 3, there are depicted exemplary embodiments of transport refrigeration systems for cooling the atmosphere within the cargo box of a truck, trailer, container, intermodal container or similar cargo transport unit. The transport refrigeration system 10 includes a transport refrigeration unit 20 including a compressor 22, a refrigerant heat rejection heat exchanger 24 (shown as a condenser in the depicted embodiments) with its associated fan(s) 25, an expansion device 26, a refrigerant evaporator heat exchanger 28 with its associated fan(s) 29, and a suction modulation valve 30 connected in a closed loop refrigerant circuit and arranged in a conventional refrigeration cycle. The transport refrigeration system 10 further includes a diesel engine 32. The transport refrigeration system 10 is mounted as in conventional practice to an exterior wall of the truck, trailer or container with the compressor 22 and the condenser heat exchanger 24 with its associated condenser fan(s) 25, and diesel engine 32 disposed externally of the refrigerated cargo box 16.

As in conventional practice, when the transport refrigerant unit 20 is operating in a cooling mode, low temperature, low pressure refrigerant vapor is compressed by the compressor 22 to a high pressure, high temperature refrigerant vapor and passed from the discharge outlet of the compressor to circulate through the refrigerant circuit to return to the suction inlet of the compressor 22. The high temperature, high pressure refrigerant vapor passes into and through the heat exchange tube coil or tube bank of the condenser heat exchanger 24, wherein the refrigerant vapor condenses to a liquid, thence through the receiver 38, which provides storage for excess liquid refrigerant, and thence through the subcooler coil of the condenser heat exchanger 24. The subcooled liquid refrigerant then passes through a first refrigerant pass of the refrigerant-to-refrigerant heat exchanger 40, and thence traverses the expansion device 26 before passing through the evaporator heat exchanger 28. In traversing the expansion device 26, which may be an electronic expansion valve ("EXV") as depicted in FIGS. 2 and 3, or a mechanical thermostatic expansion valve ("TXV"), the liquid refrigerant is expanded to a lower temperature and lower pressure prior to passing to the evaporator heat exchanger 28.

In flowing through the heat exchange tube coil or tube bank of the evaporator heat exchanger 28, the refrigerant evaporates, and is typically superheated, as it passes in heat exchange relationship return air drawn from the cargo space 18 passing through the airside pass of the evaporator heat exchanger 28. The refrigerant vapor thence traverses a second refrigerant pass of the refrigerant-to-refrigerant heat exchanger 40 in heat exchange relationship with the liquid refrigerant passing through the first refrigerant pass thereof. Before entering the suction inlet of the compressor 22, the refrigerant vapor passes through the suction modulation valve 30 disposed downstream with respect to refrigerant flow of the refrigerant-to-refrigerant heat exchanger 40 and upstream with respect to refrigerant flow of the suction inlet of the compressor 22.

Air drawn from within the cargo box 16 by the evaporator fan(s) 29 associated with the evaporator heat exchanger 28, is passed over the external heat transfer surface of the heat exchange tube coil or tube bank of the evaporator heat exchanger 28 in heat exchange relationship with refrigerant passing through the tubes of the evaporator heat exchanger 28, whereby the air is cooled. The cooled air is circulated back into the interior space 18 of the cargo box 16 to maintain the cargo box temperature within a preset relatively narrow range of at a required box temperature for the particular perishable goods stowed within the cargo box. The air drawn from the cargo box is referred to as "return air" and the air circulated back to the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

In the embodiment illustrated in FIG. 3, an electric resistance heater 44 is provided in operative association with the evaporator heat exchanger 28. The electric resistance heater 44 may be selectively energized by the refrigeration unit controller 34. For example, in cold ambient temperature conditions, it may be necessary to operate the transport refrigerant unit 20 in a heating mode, rather than a cooling mode. In the heating mode, the electric resistance heater 44 is energized and the evaporator fan(s) 29 are activated to circulate air drawn from the cargo space 18 through the evaporator air side pass and back into the cargo space 18. In passing through the evaporator air side pass the circulating box air traverses the energized electric resistance heater 44 and is heated. As in conventional practice, the electric resistance heater 44 may be energized, with the evaporator fan(s) 29 off, when the transport refrigeration unit 20 is operated in a defrost mode, to melt frost from the heat exchange surface of the evaporator heat exchanger 28.

In the embodiment of the transport refrigeration system depicted in FIG. 2, the compressor 22 comprises a reciprocating compressor having a compressing mechanism (not shown) mounted on a shaft that is directly coupled to and driven by the fuel-fired engine 32. In this embodiment, the fan(s) 25 and the fan(s) 29 may also be driven by the fuel-fired engine 32 through a belt or chain drive. Additionally, the engine 32 may also power an alternator, again through a belt or chain drive, to generate electric current for powering the refrigerant unit controller 34 and other on-board electrical or electronic components of the transport refrigeration system 10.

In the embodiment of the transport refrigeration system depicted in FIG. 3, the compressor 22 comprises a semi-hermetic scroll compressor having an internal electric drive motor and a compression mechanism having an orbital scroll mounted on a drive shaft driven by the internal electric drive motor that are all sealed within a common housing of the compressor 22. The fueled-fired engine 32 drives an electric generator 42 that generates electrical power for driving the compressor motor which in turn drives the compression mechanism of the compressor 22. The drive shaft of the fueled-fired engine drives the shaft of the generator 42. In this embodiment, the fan(s) 25 and the fan(s) 29 may be driven by electric motors that are supplied with electric current produced by the generator 42. In an electrically powered embodiment of the transport refrigeration system 10, the generator 42 comprises a single on-board engine driven synchronous generator configured to selectively produce at least one AC voltage at one or more frequencies.

In an embodiment, the fueled-fired engine 32 comprises a diesel fueled piston engine, but it is to be understood that virtually any engine may be used that meets the space requirements and is capable of powering the compressor 22 or the generator 42. By way of example, the engine 32 may comprise a diesel fueled piston engine, a gasoline fueled piston engine, a natural gas or propane fuel piston engine, as well as other piston or non-piston engines that are fuel-fired.

As noted previously, the transport refrigeration system 10 also includes an electronic refrigeration unit controller 34 that is configured to operate the transport refrigeration unit 20 to maintain a predetermined thermal environment within the interior space 18 defined within the cargo box 16 wherein the product is stored during transport. The refrigerant unit controller 34 maintains the predetermined thermal environment by selectively activating and deactivating the various components of the refrigerant vapor compression system, including the compressor 22, the fan(s) 25 associated with the condenser heat exchanger 24, the fan(s) 29 associated with the evaporator heat exchanger 28, and various valves in the refrigerant circuit, including but not limited to the suction modulation valve 30, to selectively vary the refrigeration load capacity of the transport refrigeration unit 20.

In one embodiment, the refrigeration unit controller 34 includes a microprocessor and an associated memory. The memory of the controller 34 may be programmed to contain preselected operator or owner desired values for various operating parameters within the system. The programming of the controller is within the ordinary skill in the art. The controller 34 may include a microprocessor board that includes the microprocessor, an associated memory, and an input/output board that contains an analog-to-digital converter which receives temperature inputs and pressure inputs from a plurality of sensors located at various points throughout the refrigerant circuit and the refrigerated cargo box, current inputs, voltage inputs, and humidity levels. The input/output board may also include drive circuits or field effect transistors and relays which receive signals or current from the refrigeration unit controller 34 and in turn control various external or peripheral devices associated with the transport refrigeration system. The particular type and design of the controller 34 is within the discretion of one of ordinary skill in the art to select and is not limiting of the invention.

Figure 4:
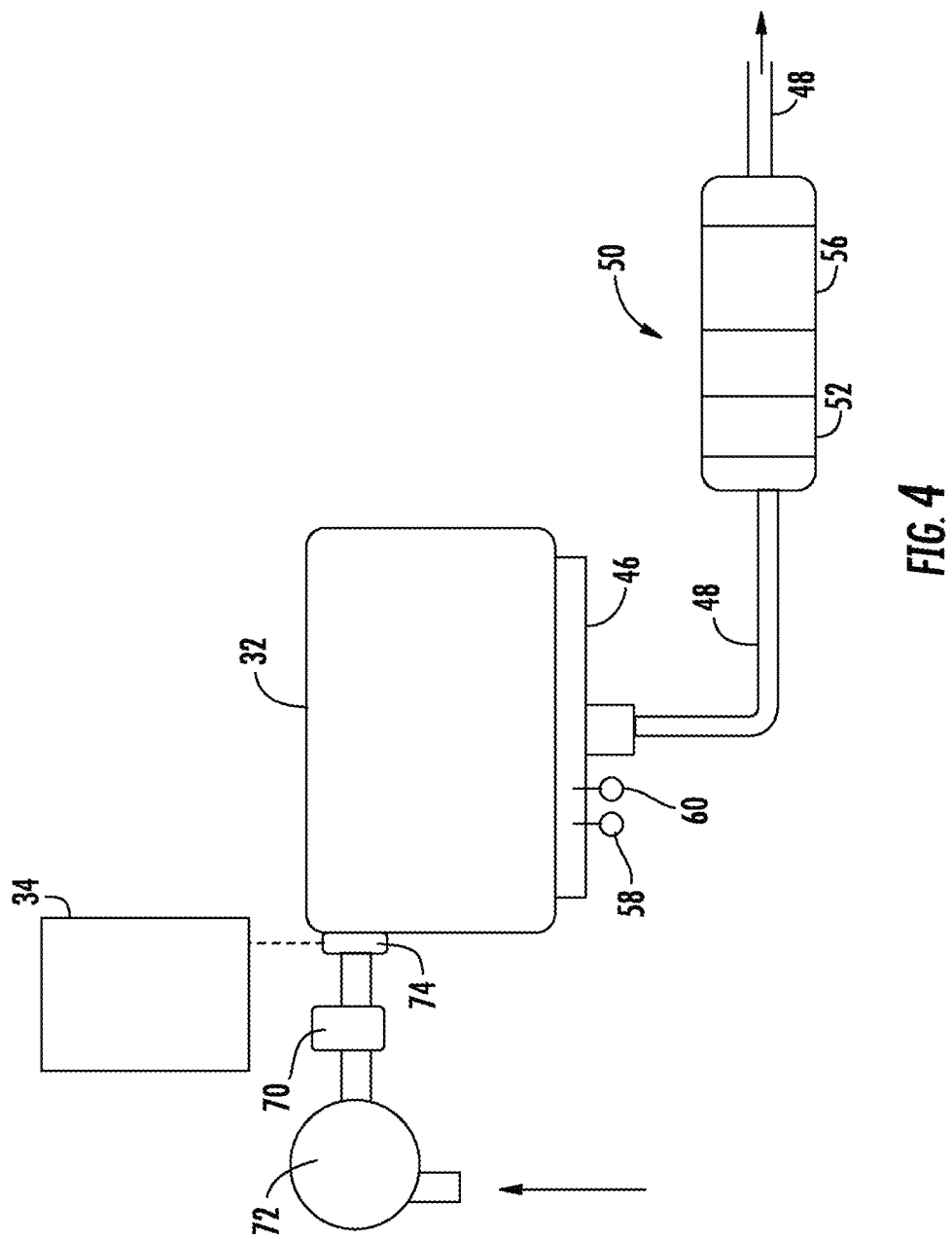
FIG. 4 is a schematic diagram of a diesel exhaust treatment unit installed in an exhaust system of the transport refrigeration system.

Referring now to FIG. 4, the exhaust system of the diesel engine 32 includes an engine exhaust manifold 46, an exhaust pipe 48, and an engine exhaust treatment unit 50 disposed in-line in the exhaust pipe 48. The engine exhaust treatment unit 50 includes at least a diesel particulate filter (DPF) 56 for collecting particulate matter entrained in the engine exhaust gases passing through the exhaust pipe 48 before the engine exhaust gases are vented to the atmosphere. Additionally, as depicted in FIG. 4, the engine exhaust treatment unit 50 may also include a diesel oxidation catalyst (DOC) 52 for oxidizing unburned hydrocarbons and carbon monoxide. The diesel oxidation catalyst 52 is disposed upstream of the diesel particulate filter 56. A temperature sensor 58 is provided for sensing the engine exhaust gases temperature, EEGT, and a pressure sensor 60 is provided for sensing the engine exhaust gases pressure, EEGP.

Over time in operation of the refrigeration unit 20, the diesel particulate filter 56 becomes more and more clogged as the collected particulate matter accumulates on the filter surfaces of the diesel particulate filter 56. Thus, it is necessary to periodically regenerate the diesel particulate filter 56 by burning off the accumulated particulate matter. For regeneration of conventional diesel particulate filters to be effective, the engine exhaust gases passing through the diesel particulate filter 56 must be at a temperature in excess of 600 degrees Celsius (1112 degrees Fahrenheit).

Air entering the engine intake may be throttled to elevate the exhaust temperature for diesel particulate filter regeneration purposes. As described above, excessive air throttling may cause excessive particulate emissions that may clog the diesel particulate filter 56. In the embodiments described herein, a maximum desired air control valve throttling level associated with an air control valve 70 that receives intake air via an air filter 72 is predetermined and programmed into the overall system. To achieve desired regeneration, while avoiding excessive air throttling, the air control valve area is reduced up to the maximum desired air control valve throttling level and supplemental exhaust heat is provided by activating a preheater 74 that is located downstream of the air control valve 70 and upstream of the diesel engine 32. Therefore, the air control valve 70 and the preheater 74 work in conjunction to achieve appropriate heat needed for regeneration. In alternative embodiments, the preheater 74 may provide all of the desired heat needed for regeneration. The preheater 74 selectively increases the intake temperature at an inlet of the diesel engine 32. The preheater 74 is utilized to start the diesel engine 32 in cold environments and is included on various types of engine assemblies. Increasing the intake temperature results in an increased exhaust temperature. When the preheater is energized it draws a significant amount of DC current from the system which increases the load on the engine. This additional load makes the diesel engine 32 work harder, resulting in the increased exhaust temperature. The existing preheater 32 may be employed in a new manner, as described in detail herein, to increase the exhaust temperature for DPF regeneration, without requiring the addition of new structural features.

Figure 5:
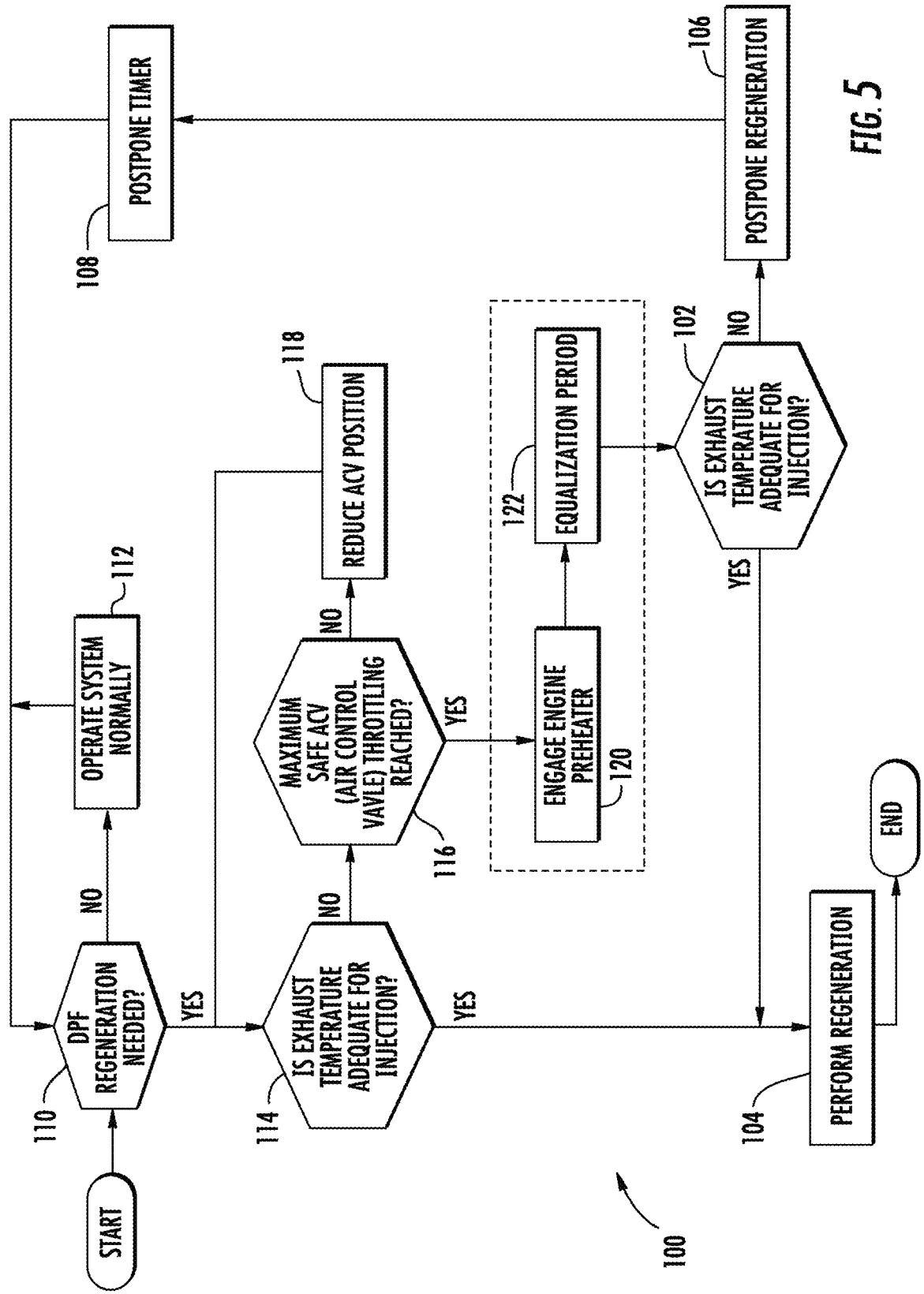
FIG. 5 is a schematic diagram of a system and method for regenerating a diesel particulate filter of the transport refrigeration system.

Referring now to FIG. 5, a system and method of diesel particulate filter regeneration is schematically illustrated and generally referenced with numeral 100. The system constantly monitors whether or not an active regeneration is needed while the engine is running. A determination is made whether diesel particulate filter regeneration is needed at block 110. If not, the system operates under normal conditions at block 112 and operation is looped until regeneration is needed. If regeneration is needed, a determination is made whether the exhaust temperature is adequate for fuel injection at block 114. If the temperature is adequate, regeneration is performed at block 104. If the temperature is not adequate, a determination is made whether the maximum desired air control valve throttling level has been reached at block 116. If it has not been reached, the air control valve position may be reduced further to increase intake air throttling at block 118. If the maximum desired air control valve throttling level has been reached, the preheater 74 is activated at block 120. A predetermined time period is provided to allow for temperature equalization at block 122. If the exhaust temperature is determined to be adequate for fuel injection at block 102, regeneration is performed at block 104. If not, regeneration is postponed at block 106. A timer is then set at block 108 and the analysis loops around in the above-described manner.

The system and method described herein increases the engine load and engine intake temperature by energizing the preheater 74 just prior to, and during, the regeneration process. This can be done in conjunction with, or replacement of, intake air throttling, depending upon the unit operation parameters. The increased engine load is provided due to the large amount of power needed by the preheater 74, while not effecting temperature control of the cargo box 16. Also, the higher engine intake air temperature increases the exhaust temperature. Both of these factors, in combination, assist to incrementally increase the engine exhaust temperature, thus allowing for less air intake throttling. Therefore, the system can achieve exhaust temperatures high enough to allow the exhaust fuel injection to work effectively. It not only allows for less intake air throttling, but will allow previously unachievable regeneration with throttling solely.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method for performing a regeneration cycle for regenerating a diesel particulate filter of a transport refrigeration system comprising:
   increasing an air intake throttling level of an engine intake air flow by reducing an air control valve area of an air control valve; and
   supplementing the temperature increase of the air intake throttling by energizing an engine preheater;
   wherein the energizing the engine preheater is initiated subsequent to the air control valve reaching a desired air throttling level.

2. The method of claim 1, further comprising delaying regeneration for an equalization period after initiation of the engine preheater.

3. The method of claim 1 wherein the desired air throttling level is a maximum desired air control valve throttling level.

4. The method of claim 1, wherein the air intake throttling level does not exceed a predetermined maximum air intake throttling level.

5. The method of claim 4, wherein the supplemental temperature increase with the engine preheater is initiated after the maximum air intake throttling level is reached.

6. A method for performing a regeneration cycle for regenerating a diesel particulate filter of a transport refrigeration system comprising:
   determining if an engine exhaust temperature is above a threshold temperature required for regeneration; and
   heating an engine intake air flow with an engine preheater until the engine exhaust temperature is above the threshold temperature required for regeneration;
   increasing an air intake throttling level of the engine intake air flow by reducing an air control valve area of an air control valve prior to heating of the engine intake air flow with the engine preheater;
   wherein heating the engine intake air flow with the engine preheater is initiated subsequent to the air control valve reaching a desired air throttling level.

7. The method of claim 6, further comprising delaying regeneration for an equalization period after initiation of the engine preheater.

8. The method of claim 6 wherein the desired air throttling level is a maximum desired air control valve throttling level.

9. The method of claim 6, wherein the air intake throttling level does not exceed a predetermined maximum air intake throttling level.

10. The method of claim 9, wherein a supplemental temperature increase with the engine preheater is initiated after the maximum air intake throttling level is reached.

11. A transport refrigeration system comprising:
    a diesel engine powering a refrigeration unit, the diesel engine having an engine air preheat circuit and an exhaust system for discharging engine exhaust gas from the diesel engine to the atmosphere;

a diesel engine exhaust gas treatment unit disposed in the diesel engine exhaust system, the diesel engine exhaust gas treatment unit including a diesel particulate filter; and a refrigeration unit controller for controlling operation of the refrigeration unit, the refrigeration unit controller configured to:

perform a regeneration cycle for regenerating the diesel particulate filter by increasing an exhaust temperature of an exhaust gas flow, the exhaust temperature increased with an engine preheater which is part of the engine air preheat circuit;

control the engine preheater to increase the exhaust temperature subsequent to exhaust temperature heating performed by throttling an engine intake air flow with an air control valve;

control the air control valve to be adjustable to an area corresponding to an air throttling level, and initiate the engine preheater subsequent to the air control valve reaching a desired air throttling level.

12. The transport refrigeration system of claim 11 wherein the desired air throttling level is a maximum desired air control valve throttling level.

\* \* \* \* \*